(12) United States Patent
Brown et al.

(10) Patent No.: US 8,499,000 B2
(45) Date of Patent: Jul. 30, 2013

(54) SYSTEM AND METHOD FOR FLOATING INDEX NAVIGATION

(75) Inventors: Jeremy Ray Brown, Orem, UT (US);
Jason Allen Sabin, Lehi, UT (US);
Daniel Robert Timpson, Lehi, UT (US)

(73) Assignee: Novell, Inc., Provo, UT (US)

( * ) Notice: Subject to any disclaimer, the term of this patent is extended or adjusted under 35 U.S.C. 154(b) by 503 days.

(21) Appl. No.: 12/607,660

(22) Filed: Oct. 28, 2009

(65) Prior Publication Data
US 2011/0029500 A1 Feb. 3, 2011

Related U.S. Application Data

(60) Provisional application No. 61/229,956, filed on Jul. 30, 2009.

(51) Int. Cl.
*G06F 17/30* (2006.01)

(52) U.S. Cl.
USPC .................................. 707/767; 707/722

(58) Field of Classification Search
CPC ............ G06F 17/3064; G06F 17/30867; G06F 17/30864
USPC ........................ 707/999.003, 705, 767, 722
See application file for complete search history.

(56) References Cited

U.S. PATENT DOCUMENTS

| | | | |
|---|---|---|---|
| 6,295,372 B1* | 9/2001 | Hawkins et al. | 382/187 |
| 7,864,163 B2* | 1/2011 | Ording et al. | 345/173 |
| 2004/0140956 A1* | 7/2004 | Kushler et al. | 345/168 |
| 2005/0004890 A1* | 1/2005 | Real et al. | 707/1 |
| 2005/0256846 A1* | 11/2005 | Zigmond et al. | 707/3 |
| 2006/0184902 A1* | 8/2006 | Hayes et al. | 715/861 |
| 2006/0282790 A1* | 12/2006 | Matthews et al. | 715/767 |
| 2007/0078828 A1* | 4/2007 | Parikh et al. | 707/3 |
| 2007/0271529 A1* | 11/2007 | Kim et al. | 715/816 |
| 2007/0277118 A1* | 11/2007 | Kotipalli et al. | 715/780 |
| 2008/0016046 A1* | 1/2008 | Guha | 707/3 |
| 2008/0109752 A1* | 5/2008 | Bayley et al. | 715/800 |
| 2008/0147653 A1* | 6/2008 | Collier | 707/6 |
| 2008/0177717 A1* | 7/2008 | Kumar et al. | 707/4 |
| 2009/0006543 A1* | 1/2009 | Smit | 709/203 |
| 2009/0063136 A1* | 3/2009 | Kaida | 704/10 |
| 2009/0119283 A1* | 5/2009 | Muehlbauer et al. | 707/5 |
| 2009/0144271 A1* | 6/2009 | Richardson et al. | 707/5 |
| 2009/0187515 A1* | 7/2009 | Andrew et al. | 706/12 |
| 2009/0222767 A1* | 9/2009 | Matthews et al. | 715/835 |
| 2009/0234711 A1* | 9/2009 | Ramer et al. | 705/10 |
| 2009/0240683 A1* | 9/2009 | Lazier et al. | 707/5 |
| 2009/0248669 A1* | 10/2009 | Shetti et al. | 707/5 |
| 2009/0271390 A1* | 10/2009 | Zheng et al. | 707/5 |
| 2010/0057698 A1* | 3/2010 | Prasad Kantamneni et al. | 707/4 |
| 2010/0076807 A1* | 3/2010 | Bells et al. | 705/9 |
| 2010/0194690 A1* | 8/2010 | Wilairat | 345/168 |
| 2010/0257479 A1* | 10/2010 | Do et al. | 715/780 |
| 2011/0022635 A1* | 1/2011 | Michael et al. | 707/780 |
| 2011/0082868 A1* | 4/2011 | Musuluri | 707/749 |
| 2011/0093488 A1* | 4/2011 | Amacker et al. | 707/767 |
| 2012/0216139 A1* | 8/2012 | Ording et al. | 715/773 |

* cited by examiner

*Primary Examiner* — Phuong Thoa Cao
(74) *Attorney, Agent, or Firm* — Haynes and Boone, LLP

(57) ABSTRACT

System and method for implementing a floating index navigation tool are described. In one embodiment, the method includes, in response to a user's updating a search term, building first and second search queries; issuing the first and second search queries to at least one database comprising a searchable index of content; and responsive to receipt of search results from the first and second search queries, displaying the first query search results in a first manner and displaying the second query search results in a second manner different than the first manner.

17 Claims, 1 Drawing Sheet

SYSTEM AND METHOD FOR FLOATING INDEX NAVIGATION

CROSS-REFERENCE

This application claims the benefit under Title 35, United States Code §119(e) of U.S. Provisional Patent Application No. 61/229,956 filed on Jul. 30, 2009, the disclosure of which is incorporated herein by reference in its entirety.

BACKGROUND

Companies are constantly looking for ways to maximize the productivity of their workforces. To this end, technology for providing Integrated Collaborative Environments ("ICEs") is being developed to provide integrated workspaces for globally distributed teams to organize and communicate via a single user interface. It is anticipated that ICEs will quickly grow beyond the ability of conventional search interfaces to enable users to locate what they need quickly and easily. Therefore, what is needed is a convenient user-friendly mechanism for searching and navigating in such ICEs, as well as other environments.

SUMMARY

One embodiment is a method of implementing a floating index navigation tool. The method comprises, in response to a user's updating a search term, building first and second search queries; issuing the first and second search queries to at least one database comprising a searchable index of content; and responsive to receipt of search results from the first and second search queries, displaying the first query search results in a first manner and displaying the second query search results in a second manner different than the first manner.

DETAILED DESCRIPTION

To better illustrate the advantages and features of the embodiments, a particular description of several embodiments will be provided with reference to the attached drawings. These drawings, and other embodiments described herein, only illustrate selected aspects of the embodiments and are not intended to limit the scope thereof. Further, despite reference to specific features illustrated in the example embodiments, it will nevertheless be understood that these features are not essential to all embodiments and no limitation of the scope thereof is thereby intended. Any alterations and further modifications in the described embodiments, and any further applications of the principles of the embodiments as described herein are contemplated as would normally occur to one skilled in the art. Furthermore, some items are shown in a simplified form, and inherently include components that are well known in the art. Further still, some items are illustrated as being in direct connection for the sake of simplicity and clarity. Despite the apparent direct connection, it is understood that such illustration does not preclude the existence of intermediate components not otherwise illustrated.

One embodiment combines the concepts of indexing and search functionality into a tool for navigation in a software product, such as, for example, ZENworks or GroupWise. In one aspect, a floating index is displayed for providing real-time search functionality throughout the product interface. For example, if a user needs to find a document entitled "Meeting Notes," the user can search or browse an instant index that appears as an overlay on the interface trailing up to down or right to left. As a result, a user can employ a regular expression format to type everything that is needed or can immediately begin simply to navigate the instant index.

Figure 1:
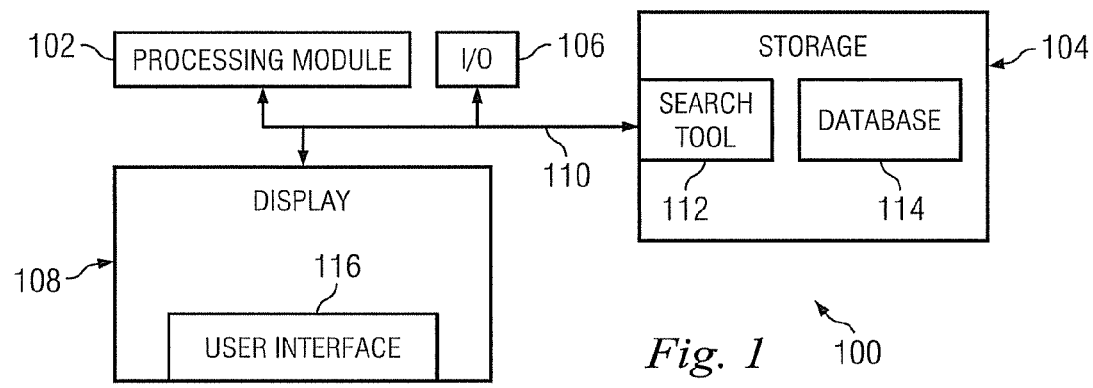
FIG. 1 is a representative block diagram of an environment in which one embodiment of a floating index navigation tool may be implemented.

FIG. 1 is a representative block diagram of an exemplary hardware environment 100 in which an embodiment may be implemented. As illustrated FIG. 1, the environment 100 comprises a processing module 102 for processing instructions, a memory and/or storage module 104 for storing data and instructions, input/output ("I/O") devices, represented by I/O 106, and at least one display, such as a display 108. All of the elements 102-108 are interconnected via one or more appropriate communications channels, represented in FIG. 1 by a single channel 110, which may include, in some embodiments, the Internet and/or other network-implemented communications channels. A search tool 112 in accordance with one embodiment is stored in the storage module 104 and has access to at least one index database 114 and comprises instructions executable by the processing module 102 for implementing the embodiments described in detail hereinbelow. In one embodiment, the search tool 112 comprises a desktop application residing and executing on a user's personal computer. In another embodiment, the search tool 112 is executed in a cloud computing or other environment located remotely from the user, with a user interface ("UI") 116 presented on a display of the user's personal computer. Additionally, some portion of the environment 100, including portions of the elements 102-114, may be implemented locally on the user's computer or remotely therefrom via a private and/or public cloud or within some other appropriate environment. In one embodiment, the database 114 comprises a searchable index of content accessible by a user via the UI 116. The database 114 is dynamic in that, as user-accessible content is added, the index of the database 114 is expanded to include the additional content. The database 114 is built using standard technology for gathering data regarding different user-accessible content and adding it to the database 114 for purposes that will be described.

Figure 2:
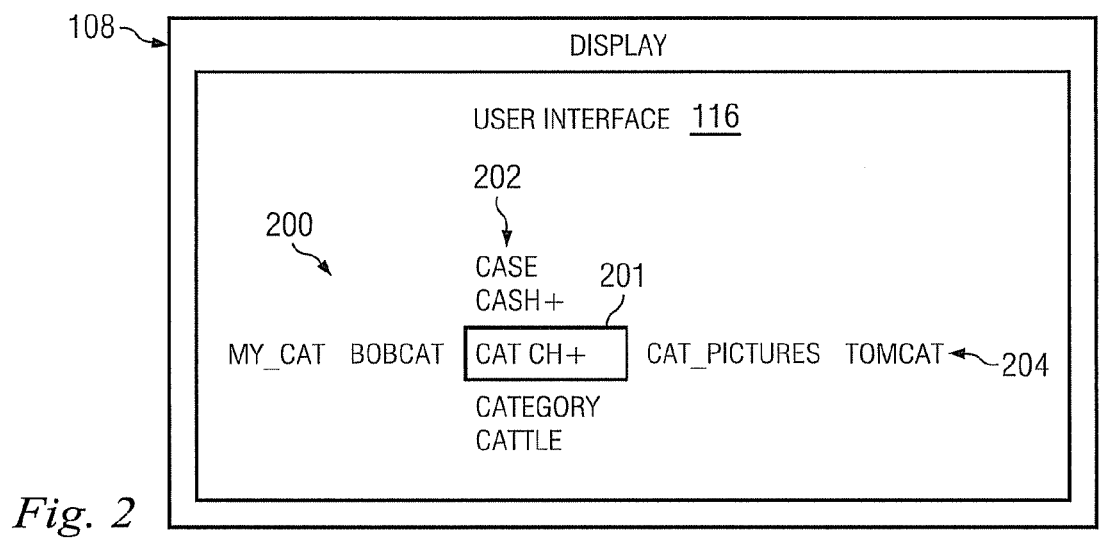
FIG. 2 illustrates one embodiment of a display of the floating index navigation tool of FIG. 1.

FIG. 2 is an illustration of a manner in which a floating index 200 in accordance with one embodiment may be displayed. As used herein, "floating" refers to the fact that the textbox 201 for entering a term or terms to be searched "floats" on top of the current web page or screen of the user interface 116 and that the index "floats" around the textbox, as will be described. As a result, everything can be accomplished on the current page or screen of the user interface. As illustrated in FIG. 2, the floating index 200 implements two types of searches; i.e., an alphabetical search, results of which are displayed as extending vertically above and below the display of the textbox 201, as designated by a reference numeral 202, and a regular expression ("RegEx") search, results of which are displayed as extending horizontally to the left and right of the textbox 201, as designated by a reference numeral 204. Although only two types of searches are implemented in the embodiment illustrated in FIG. 2, it will be recognized that more, fewer, and/or different types of searches can be implemented and the results displayed as extending radially in different directions/at different angles from the textbox 201.

Inside the textbox 201, auto-complete functionality is preferably operational and implemented in a manner that will be readily apparent to one of ordinary skill in the art. Additionally, plus signs (+) indicate expansions that can be taken from the word as displayed to change the view in a manner that will also be apparent to one of ordinary skill in the art. For example, in the embodiment shown in FIG. 2, selecting (e.g., via mouse, trackball, keyboard, or the like) the plus sign displayed therein after "CAT" changes "CAT" to "CATCH", which would cause a corresponding change in the results 202, 204. In one embodiment, a mouse, trackball, arrow keys, or the like may be used to navigate through the displayed results 202, 204. The combination of the results of more than one type of search into a single view enables a variety of types information to be easily located, which is especially beneficial in the context of ICE, but provides numerous benefits in other contexts as well. Additionally, the RegEx search can be designed to take into account various user preferences, including case insensitive and how to organize characters.

Figure 3:
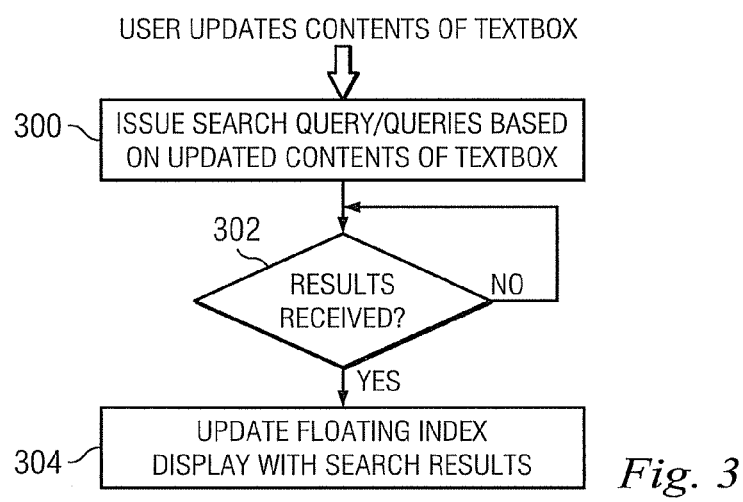
FIG. 3 illustrates a flowchart of the operation of one embodiment of the floating index navigation tool of FIG. 1.

FIG. 3 is a flowchart of one embodiment of the operation of the search tool 112. The process is initiated by any update to the contents of the textbox 201. Such updating may include a user typing one or more characters in the textbox, a user selecting one of the results displayed around the textbox, and/or a user selecting an auto-completion or expansion option offered in the textbox. In response to the contents of the textbox 201 being updated, in step 300, the search tool 112 builds one or more appropriate search queries, depending on the types of search results to be presented in the floating index 200, and submits the query or queries to one or more databases, such as the database 114. In step 302, a determination is made whether all of the results have been received in response to the one or more queries. If not, execution remains at step 302 until all of the results have been received, at which point execution proceeds to step 304. In step 304, the results are displayed around the textbox 201.

The method illustrated in FIG. 3 will now be described using the example presented in FIG. 2. It will be assumed that, at the point at which execution begins, the contents of the textbox comprise "CAT." In step 300, alphabetical and RegEx search queries are built and issued to the database. Once the results are received (step 302), in step 304, the results of the alphabetical search query are displayed around the textbox 201 as results 202, while the results of the RegEx search query are displayed around the textbox 201 as results 204.

The embodiments described herein provide a powerful method of employing regular expressions and instant indexes, as well as any other type of search methodology, including content- and context-sensitive searches, to aid a user in finding what he or she needs without requiring any special syntax, separate pages, or limited views into the data. The floating index is a unique view that will help a user find items more easily than otherwise possible using special searches for the exact person, word, or sentence. Specifically, the index will provide all of the possible options, thereby enabling the user to search and browse to the correct location.

The embodiments described herein would be a great addition to help pages that have people struggling to navigate within the pages. Alternatively, the embodiments could be employed using a tree format of searching for content and/or menus instead of an index. Additionally, the embodiments would be beneficial for organizing content in the same manner. For example, a pinwheel of items separating type, content, date, author could be presented in the same manner as the display but with a different underlying content layout.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Therefore, the claims should be interpreted in a broad manner, consistent with the present disclosure.

What is claimed is:

1. A method of implementing a floating index navigation tool, the method comprising:
   in response to updating a search term using a floating text box, building first and second search queries;
   issuing the first and second search queries to at least one database comprising a searchable index of content; and
   responsive to receipt of search results from the first and second search queries, displaying the first query search results as a first floating index extending horizontally to the left and to the fight of the floating text box and displaying the second query search results as a second floating index extending vertically above and below the floating text box.

2. The method of claim 1 wherein the updating a search term comprises a user selecting one of the displayed search results.

3. The method of claim 1 wherein the updating a search term comprises a user typing at least one character in the floating text box.

4. The method of claim 1 wherein the updating a search term comprises a user selecting an expansion or auto-complete option of the displayed search results.

5. The method of claim 1 wherein each search query is provided for at least one of an alphabetical search, a regular expression search, a context-sensitive search, and a content-sensitive search.

6. A system for implementing a floating index navigation tool, the system comprising at least one computer including instructions for causing the at least one computer to:
   provide a floating text box;
   build first and second search queries in response to updating a search term using the floating text box;
   issue the first and second search queries to at least one database comprising a searchable index of content; and
   responsive to receipt of search results from the first and second search queries, display the first query search results as a first floating index extending horizontally to the left and to the right of the floating text box and display the second query search results as a second floating index extending vertically above and below the floating text box.

7. The system of claim 6 wherein the updating a search term comprises one of a user's selecting one of the displayed search results, typing at least one character in the floating text box, and selecting an expansion or auto-complete option.

8. The system of claim 6 wherein each of the first and second search queries is provided for at least one of an alphabetical search, a regular expression search, a context-sensitive search, and a content-sensitive search.

9. A computer program product for implementing a floating index navigation tool, the computer program product comprising a non-transitory computer-readable medium having stored therein instructions for causing a computer to:

in response to updating a search term using a floating text box, build first and second search queries;

issue the first and second search queries to at least one database comprising a searchable index of content;

responsive to receipt of search results from the first and second search queries, display the first query search results as a first floating index extending horizontally to the left and to the right of the floating text box and display the second query search results as a second floating index extending vertically above and below the floating text box.

10. The computer program product of claim 9 wherein the updating a search term comprises a user selecting one of the displayed search results.

11. The computer program product of claim 9 wherein the updating a search term comprises a user typing at least one character in the floating text box.

12. The computer program product of claim 9 wherein the updating a search term comprises a user selecting an expansion or auto-complete option.

13. The computer program product of claim 8 wherein one of the first and second search queries is provided for an alphabetical search.

14. The computer program product of claim 9 wherein one of the first and second search queries is provided for a regular expression search.

15. The computer program product of claim 9 wherein one of the first and second search queries is provided for a context-sensitive search.

16. The computer program product of claim 9 wherein one of the first and second search queries is provided for a content-sensitive search.

17. The computer program product of claim 9 wherein building first and second search queries takes into account a user preference, and wherein the user preference includes case preferences and organization preferences.

\* \* \* \* \*